United States Patent
Schäuble et al.

(10) Patent No.: US 11,336,758 B2
(45) Date of Patent: May 17, 2022

(54) FIELD DEVICE ADAPTER FOR WIRELESS DATA TRANSFER

(71) Applicant: Endress+Hauser SE+Co. KG, Maulburg (DE)

(72) Inventors: Harald Schäuble, Lörrach (DE); Dirk Lill, Freiburg (DE)

(73) Assignee: ENDRESS+HAUSER SE+CO. KG, Maulburg (DE)

( * ) Notice: Subject to any disclaimer, the term of this patent is extended or adjusted under 35 U.S.C. 154(b) by 0 days.

(21) Appl. No.: 17/312,256

(22) PCT Filed: Nov. 11, 2019

(86) PCT No.: PCT/EP2019/080818
§ 371 (c)(1),
(2) Date: Jun. 9, 2021

(87) PCT Pub. No.: WO2020/120045
PCT Pub. Date: Jun. 18, 2020

(65) Prior Publication Data
US 2022/0038562 A1    Feb. 3, 2022

(30) Foreign Application Priority Data
Dec. 11, 2018    (DE) .................... 10 2018 131 685.2

(51) Int. Cl.
*H04L 69/323* (2022.01)
*H04B 1/38* (2015.01)

(52) U.S. Cl.
CPC ............. *H04L 69/323* (2013.01); *H04B 1/38* (2013.01)

(58) Field of Classification Search
CPC ................................ H04L 69/323; H04B 1/38
See application file for complete search history.

(56) References Cited

U.S. PATENT DOCUMENTS

| | | | |
|---|---|---|---|
| 8,762,745 B2* | 6/2014 | Seiler ................. | G05B 19/4185 713/323 |
| 9,544,027 B2* | 1/2017 | Cornell ................ | H04B 5/0031 |
| 10,761,524 B2* | 9/2020 | Wallace ............. | G05B 23/0224 |
| 2013/0106369 A1* | 5/2013 | Arunachalam .... | G05B 19/0423 323/234 |

(Continued)

FOREIGN PATENT DOCUMENTS

| | | |
|---|---|---|
| DE | 10352286 A1 | 6/2005 |
| DE | 102008036967 A1 | 2/2010 |

(Continued)

*Primary Examiner* — Dac V Ha
(74) *Attorney, Agent, or Firm* — Mark A. Logan; Endress+Hauser (USA) Holding Inc.

(57) ABSTRACT

Disclosed is a field device adapter for HART communication with a field device. The field device adapter includes an adapter housing with an adapter chamber; arranged in the adapter chamber, an adapter electronics, which is adapted wirelessly to receive a second radio signal and by means of the second radio signal to control a circuit for shunting the communication resistor in such a manner that at least one communication resistor is selectively switchable in and out per radio, so that in a shunted condition a first radio signal received by the adapter electronics can be converted into a, preferably HART based, two conductor signal and modulated via the tapping point onto the loop current.

11 Claims, 4 Drawing Sheets

(56) References Cited

U.S. PATENT DOCUMENTS

2020/0186196 A1\* 6/2020 Schäuble ................ H04Q 9/00

FOREIGN PATENT DOCUMENTS

| | | |
|---|---|---|
| DE | 102008043199 A1 | 4/2010 |
| DE | 102009047535 A1 | 6/2011 |
| DE | 102013109096 A1 | 2/2015 |
| EP | 2984530 A1 | 2/2016 |
| WO | 2016165928 A1 | 10/2016 |

\* cited by examiner

FIELD DEVICE ADAPTER FOR WIRELESS DATA TRANSFER

CROSS-REFERENCE TO RELATED APPLICATIONS

The present application is related to and claims the priority benefit of German Patent Application No. 10 2018 131 685.2, filed on Dec. 11, 2018 and International Patent Application No. PCT/EP2019/080818, filed on Nov. 11, 2019, the entire contents of which are incorporated herein by reference.

TECHNICAL FIELD

The invention relates to a field device adapter for HART communication with a field device and to a system of automation technology.

BACKGROUND

In automation technology, especially in process automation technology, field devices are often applied, which serve for determining, optimizing and/or influencing process variables. Serving for registering process variables are sensors, such as, for example, fill level measuring devices, flow measuring devices, pressure- and temperature measuring devices, conductivity measuring devices, etc., which register the corresponding process variables, fill level, flow, pressure, temperature, and conductivity. Serving for influencing process variables are actuators, such as, for example, valves or pumps, via which the flow of a liquid in a pipeline section, or the fill level in a container, can be changed. Referred to as field devices in the sense of this invention are all devices, which are applied near to a process and which register process relevant information, especially one or more process variables (pressure, flow, temperature, etc.) or in the case of actuators set one or more process variables.

A large number of such field devices are manufactured and sold by the firm, Endress+Hauser.

Currently in a large number of existing automated plants, two conductor field devices are still being used, which are connected via a two-conductor line to a superordinated unit, for example, a control unit in the form of a PLC. Two conductor field devices are embodied in such a manner that the measured-, or actuating values are communicated, i.e. transmitted, or transferred, as main-process variable via the two-conductor line, e.g. a two conductor cable in the form of an analog 4-20 mA signal. For sending all other data, especially the HART protocol has proven itself, in the case of which the analog electrical current signal of 4-20 mA is superimposed with a frequency signal as digital, two conductor signal for data transmission. The HART protocol switches between 1200 Hz and 2200 Hz for data transmission, wherein the lower frequency stands for a logical "1" and the higher frequency for a logical "0". In this way, the only slowly varying analog electrical current signal remains unaffected by the frequency superpositioning, so that analog and digital communication is united by means of HART.

In order to enable a HART standard conforming communication on the two-conductor line, a HART communication resistor is necessary. The HART communication resistor can either be integrated in a communication participant (field device, superordinated unit, service unit) or be introduced virtually as an independent unit into the two-conductor line.

It is to be noted, however, that when a HART communication resistor is already in the two-conductor line, for example, for enabling communication between a field device and a superordinated unit, especially a PLC (programmable logic control unit), no further HART communication resistor is connected. This occurs especially when a HART communication is needed between the field device and a service unit.

SUMMARY

An object of the invention is to enable an as defect free as possible HART communication, especially from a service unit to a field device.

The object is achieved according to the invention by the field device adapter as defined in claim 1 and the system as defined in claim 8.

The field device adapter of the invention for HART communication with a field device includes at least:
  an adapter housing having a first end and a second end, wherein the first end has at least a first connecting element and a second connecting element for electrical connecting of a first two-conductor line and the second end has at least a third connecting element and a fourth connecting element for electrical connecting of a second two-conductor line, wherein the adapter housing has, furthermore, an adapter chamber between the first and the second end;
  arranged in the adapter chamber, an adapter electronics, which connects the first connecting element with the third connecting element by a first electrical connecting line and the second connecting element with the fourth connecting element by a second electrical connecting line, wherein the adapter electronics includes, furthermore, a communication resistor provided in the first connecting line and a preferably unregulated power supply circuit for providing a supply voltage from a loop current flowing in the first connecting line, wherein the adapter electronics has, furthermore, installed as a secondary master, a HART modem, which is connected with the first connecting line via a tapping point, and a circuit for shunting the communication resistor, wherein the adapter electronics is adapted to receive a second radio signal wirelessly and by means of the second radio signal to control the circuit for shunting the communication resistor in such a manner that at least the communication resistor is selectively switchable in and out per radio, so that in a shunted condition a first radio signal received by the adapter electronics can be converted into a, preferably HART based, two conductor signal and modulated via the tapping point onto the loop current.

According to the invention, an internal (HART) communication resistor of the field device adapter is switchable in and out per radio, such that, in given cases, an external HART communication resistor can be used. For the switching in and out, the internal (HART) communication resistor is shunted. The control can occur via a radio interface, such as e.g. a Bluetooth interface or a variant modified therefrom, namely Bluetooth Low Energy. On the one hand, such can occur via a separate radio interface (separate configuration interface), or via an already present interface of the field device adapter for wirelessly transferring HART based two wire signals, which are exchanged between a superordinated unit and a field device.

An advantageous embodiment of the field device adapter of the invention can provide that the circuit for shunting the communication resistor includes at least a first switching element having preferably a transistor or an analog switch and connected in parallel with the communication resistor and which is conductive in the shunted condition of the communication resistor. Especially, the embodiment can provide that the circuit for shunting the communication resistor has, furthermore, a second and a third switching element, wherein the second switching element is arranged in a third connecting line connecting the HART modem with the first connecting line and the third switching element is arranged in a fourth connecting line connecting the third connecting line with the second connecting line, and wherein the adapter electronics is adapted in the shunted condition to switch the second switching element blocking and to switch the third and fourth switching elements as a function of an installed position of an external HART communication resistor (36). In supplementation, the embodiment can provide that the adapter electronics has, furthermore, contactable from outside of the adapter housing a fifth connecting element, which is connected with the third connecting line via a fourth switching element, and wherein the adapter electronics is adapted in the shunted condition to switch the second and third switching elements, in each case, blocking and to switch the fourth switching element conducting, so that via the fifth connecting element a shunting conductor is connectable to the first two-conductor line. Alternatively, the embodiment can provide that the adapter electronics has, furthermore, contactable from outside of the adapter housing a fifth connecting element, which is connected with the third connecting line via a fourth switching element, and wherein the adapter electronics is adapted in the shunted condition to switch the second switching element blocking and the third switching element and preferably also the fourth switching element as a function of an installed position of an external HART communication resistor.

Another advantageous embodiment of the field device adapter of the invention can provide that the adapter electronics is adapted, furthermore, in a turned off condition, in which no HART communication initiated by the field device adapter is or should be possible, to switch the first switching element conducting and the second switching element and preferably also the third switching element blocking.

Another advantageous embodiment of the field device of the invention adapter can provide that the adapter electronics includes a second radio module (as a separate configuration interface) with an antenna for receiving the second radio signal, wherein the power supply circuit supplies the second radio module with energy via the supply voltage and the second radio module is adapted to control the circuit for shunting the communication resistor by the second radio signal, and wherein the second radio module is adapted to receive the second radio signal using a radio-based point-to-point connection, preferably a Bluetooth-, a Bluetooth Low Energy-, an NFC- or an RFID connection.

Another advantageous embodiment of the field device adapter of the invention can provide that the adapter electronics includes a first radio module with an antenna for transmitting and/or receiving the first radio signal, wherein the power supply circuit supplies the first radio module with energy via the supply voltage and the first radio module is adapted to convert the two conductor signal into the first radio signal and vice versa, wherein the first radio module is adapted, furthermore, to transmit and to receive the first radio signal according to one of the following radio protocols, or radio technologies:
 a Bluetooth protocol or a modified variant thereof,
 a 6LoWPAN protocol,
 a wireless HART protocol,
 a 6TiSCH protocol, and/or
 a mobile radio technology protocol, preferably 2G, 3G, LTE or 5G, especially preferably NB-IoT.

The invention relates further to a system of automation technology, comprising:
 at least one field device adapter as defined in one or more of the above paragraphs;
 at least one superordinated unit;
 at least one field device of automation technology having a field device electronics arranged in a field device housing;
 a first two-conductor line, which connects the adapter electronics via the first and second connecting elements electrically to the field device electronics;
 a second two-conductor line, which connects the adapter electronics via the third and fourth connecting elements electrically to the superordinated unit;
 a mobile service unit, which is adapted with the aid of the second radio signal to control the circuit for shunting the communication resistor in such a manner that at least the communication resistor is selectively switchable in and out per radio.

An advantageous embodiment of the system of the invention can provide that the system includes, furthermore, a HART communication resistor arranged in a plus-conductor of the second two-conductor line and a shunting conductor, wherein the shunting conductor connects the fifth connecting element with the plus-conductor of the second two-conductor line in the region between the power supply circuit and the superordinated unit.

An alternative embodiment of the system of the invention can provide that the system comprises, furthermore, a HART communication resistor arranged in a minus-conductor of the second two-conductor line.

BRIEF DESCRIPTION OF THE DRAWINGS

The invention will now be explained in greater detail based on the appended drawing, the figures of which show as follows.

DETAILED DESCRIPTION

Figure 1:
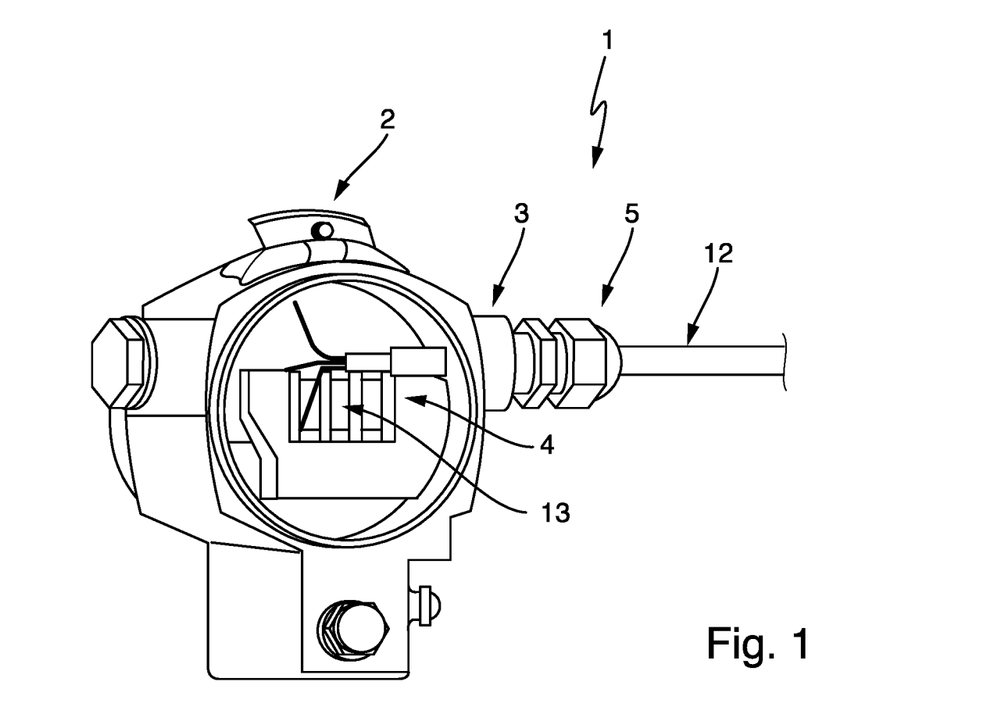
FIG. 1 shows a schematic view of a two-conductor field device, such as it currently can be found in a large number of existing automated plants and with which data can be communicated purely by wire via a two-conductor line.

FIG. 1 shows schematically a two-conductor field device 1, which includes a metal housing 2, in which a field device electronics 4 is arranged. The field device electronics 4 is embodied in such a manner that such has connection terminals 13, via which a first two-conductor line 12a having a plus-conductor 12aa and a minus-conductor 12ab is electrically connected. Via the first two-conductor line, the field device electronics 4 and, thus, the field device 1, is connected to a superordinated unit (not shown in FIG. 1), in order data to communicate by wire with the superordinated unit. In such case, the measured-, or actuating values of the main-process variable are communicated via the first two-conductor line 12a in analog form as a 4-20 mA electrical current signal and all other data are transferred in the form of a digital, two conductor signal according to the HART standard.

In order to be able to contact the first two-conductor line 12a coming from outside of the housing 2 electrically with the field device electronics 4 arranged in the housing 2, the metal housing 2 includes a housing opening 3. Mounted in the housing opening 3 is a cable gland 5, so that the first two-conductor line 12a is introducible through the cable gland 5 into the housing 2. The cable gland 5 is preferably embodied in the form of a PG cable gland, i.e. a cable gland with steel conduit thread, according to the standard, DIN EN 62444, published May 2014. The cable gland 5 can be embodied, for example, as an M20 PG cable gland, i.e. one having an outer diameter of 20 mm.

Figure 2:
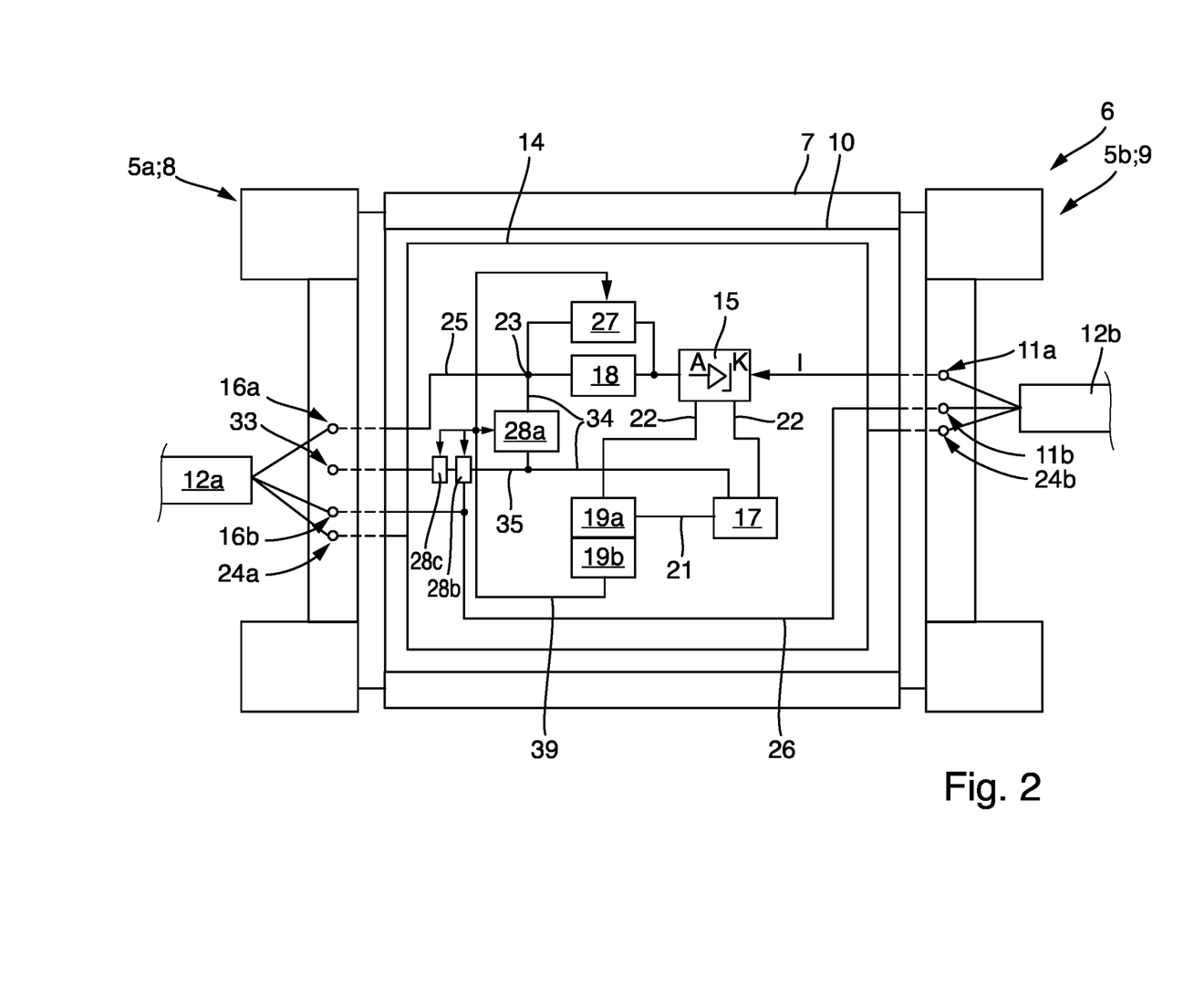
FIG. 2 shows a schematic view of a field device adapter of the present disclosure for wireless data transfer.

FIG. 2 shows a schematic view of a field device adapter 6 of the invention for wireless data transfer. Field device adapter 6 includes an adapter housing 7 with an adapter chamber 10 and can, for example, have an essentially cylindrical shape. For connecting, first and second two-conductor lines 12a, 12b, contacting means are provided on the end faces 8, 9, of the adapter housing. Thus, on the first end, i.e. the first end face 8, first and second connecting elements 16a, 16b as well as a ground connecting element 24a are provided for connecting the first two-conductor line 12a. And, on the second end, i.e. the second end face 9, third and fourth connecting elements 11a, 11b as well as a ground connection 24b are provided for connecting the second two-conductor line 12b. In supplementation, a fifth connecting element 33 can be provided, for example, on the first or second end face 8, 9 of the adapter housing 7, led out for connecting a shunting conductor.

The adapter housing 7 includes, furthermore, on the end faces 8, 9 in a preferred embodiment, cable glands 5a and 5b, through which the two-wire lines 12a, 12b are led in. The fifth connecting element 33 can likewise be accessible through one of the two cable glands. Cable glands 5 are each preferably embodied in the form of a PG cable gland, i.e. a cable gland with steel conduit thread, according to the standard, DIN EN 62444, of May 2014. Cable glands 5a, 5b can be embodied, for example, as a M20 PG cable gland, i.e. having an outer diameter of 20 mm.

Furthermore, the field device adapter 6 includes arranged within the adapter chamber 10 an adapter electronics 14, which connects the first connecting element 16a with the third connecting element 11a via a first electrical connecting line 25 and the second connecting element 16b with the fourth connecting element 11b via a second electrical connecting line 26. Via the first electrical connecting line 25, a loop current I is led from the second two-conductor line 12b to the first two-conductor line 12a.

In order to provide a supply voltage for energy supply of the adapter electronics 14, the field device adapter 6 includes a, preferably unregulated, power supply circuit 15, i.e. a power supply circuit, which provides, independently of the loop current and/or without a feedback circuit, a defined supply voltage. Power supply circuit 15 can, such as shown in FIG. 2, be embodied as part of the adapter electronics 14 or separately from the adapter electronics 14. Power supply circuit 15 includes at least one diode, which is introduced in the first electrical connecting line 25 and via which a supply voltage is provided by a voltage tap. For example, a Z diode, or Zener diode, can be arranged in such a manner in the first electrical connecting line 25 that an anode A is located in the direction of the first connecting element 16a and a cathode K is located in the direction of the third connecting element 11a, so that the Z diode is arranged in blocking direction for the loop current I flowing through the first electrical connecting line 25 and the voltage tap occurs between the anode A and the cathode K.

Alternatively, the power supply circuit 15 can also comprise a plurality of individual diodes, which are all arranged in the flow direction for the loop current I flowing through the first electrical connecting line 25, wherein the voltage tap occurs across the anode of the first diode and the cathode of the last diode.

The adapter electronics 14 is connected on the first end 8 with the two connecting elements 16a and 16b with the first two-conductor line 12a and on the second side 9 with the two connecting elements 11a and 11b with the second two-conductor line 12b. Furthermore, the adapter electronics can be connected via first and second ground connections 24a and 24b with ground lines of the first and second two-conductor lines.

The adapter electronics 14 is, furthermore, adapted to forward in both directions a two conductor signal modulated on the loop current and embodied according to the HART standard and communicated between a field device connected via the first two-conductor line and a superordinated unit connected via the second two-conductor line. Furthermore, the adapter electronics 14 is adapted to tap the imposed two conductor signals via a tapping point 23 provided between the first connecting element 16a and the power supply circuit 15 in the first electrical connecting line 25, to convert such into radio signals and to transmit the radio signals per radio. For this, the adapter electronics 14 includes a first radio module 19a with an antenna. The first radio module 19a serves both to transmit the two conductor signal previously modulated on the loop current as well as also, conversely, wirelessly to receive radio signals representing two conductor signals and to convert such into a corresponding two conductor signal, such that it can be modulated onto the loop current. In this way, the field device can be communicated with via the field device adapter by means of a HART communication.

The first radio module 19a is likewise supplied with energy by the power supply circuit 15. The first radio module 19a is embodied especially in such a manner that radio signals are transmittable according to a Bluetooth protocol or a variant modified therefrom, a 6LoWPAN protocol, a wireless HART protocol, and/or a 6TiSCH protocol.

The adapter electronics 14 includes, furthermore, for converting the superimposed two conductor signals into suitable signals for transmission by means of the first radio module 19a and vice versa a HART modem 17, which is connected for communication with the radio unit 19, for example, by means of a serial interface 21, for example, UART. The HART modem 17 is likewise supplied with energy by the power supply circuit 15.

In order that the adapter electronics 14 supplies the superimposed two conductor signals via the tapping point 23 or that they can be modulated onto the loop current I, furthermore, a communication resistor 18 is provided in the first electrical connecting line 25. Via the communication resistor 18, a voltage modulation corresponding to the two conductor signal to be transmitted is implemented. The communication resistor 18 is, in such case, arranged between the power supply circuit 15 and the tapping point 23 in the first electrical connecting line 25.

In order that the adapter electronics 14 can communicate digital, two conductor signals to the field device 1, the HART modem 17 is adapted as a secondary master. In this way, for example, a field device 1 can be wirelessly parametered per radio via the field device adapter, in that the radio signals received wirelessly by the first radio module 19a are converted by means of the HART modem 17 and modulated onto the loop current via the tapping point 23.

According to the invention, the adapter electronics includes, furthermore, a circuit for shunting the communication resistor, for the case, in which an external HART communication resistor is already in the two-conductor line. The circuit for shunting the communication resistor 18 includes a first switching element 27, for example, a transistor or an analog switch, which is connected in parallel with the communication resistor of the field device adapter 6, so that via the first switching element 27 the communication resistor 18 can be shunted out, i.e. bypassed. Equally, the first switching element 27 can be switched into a blocking, non-shunting condition, so that the communication resistor 18 is not shunted and so can be used for the HART communication.

In supplementation, the circuit for shunting the communication resistor can furthermore, have second and third switching elements 28a, 28b. Via the second and third switching elements 28a, 28b, in the case, in which an external HART communication resistor 36 is already present in the two-conductor line and the communication resistor 18 is in the shunted condition, the tapping point necessary for HART communication can be appropriately changed or adapted. For this, the second switching element 28a is arranged in a third connecting line 34 connecting the HART modem 17 with the first connecting line 25 and the third switching element 28b is arranged in a fourth connecting line 35 connecting the third connecting line 34 with the second connecting line 26. In this way, when an external HART communication resistor is already present in a minus-conductor 12ab, 12ba of the first or second two-conductor line 12a, 12b, the tapping point 23 can be switched to the second connecting line 26. FIG. 3b shows such a configuration by way of example. The previously introduced external HART communication resistor 36 serves to implement a HART communication between the field device 1 and a superordinated unit 32.

Figure 3A:
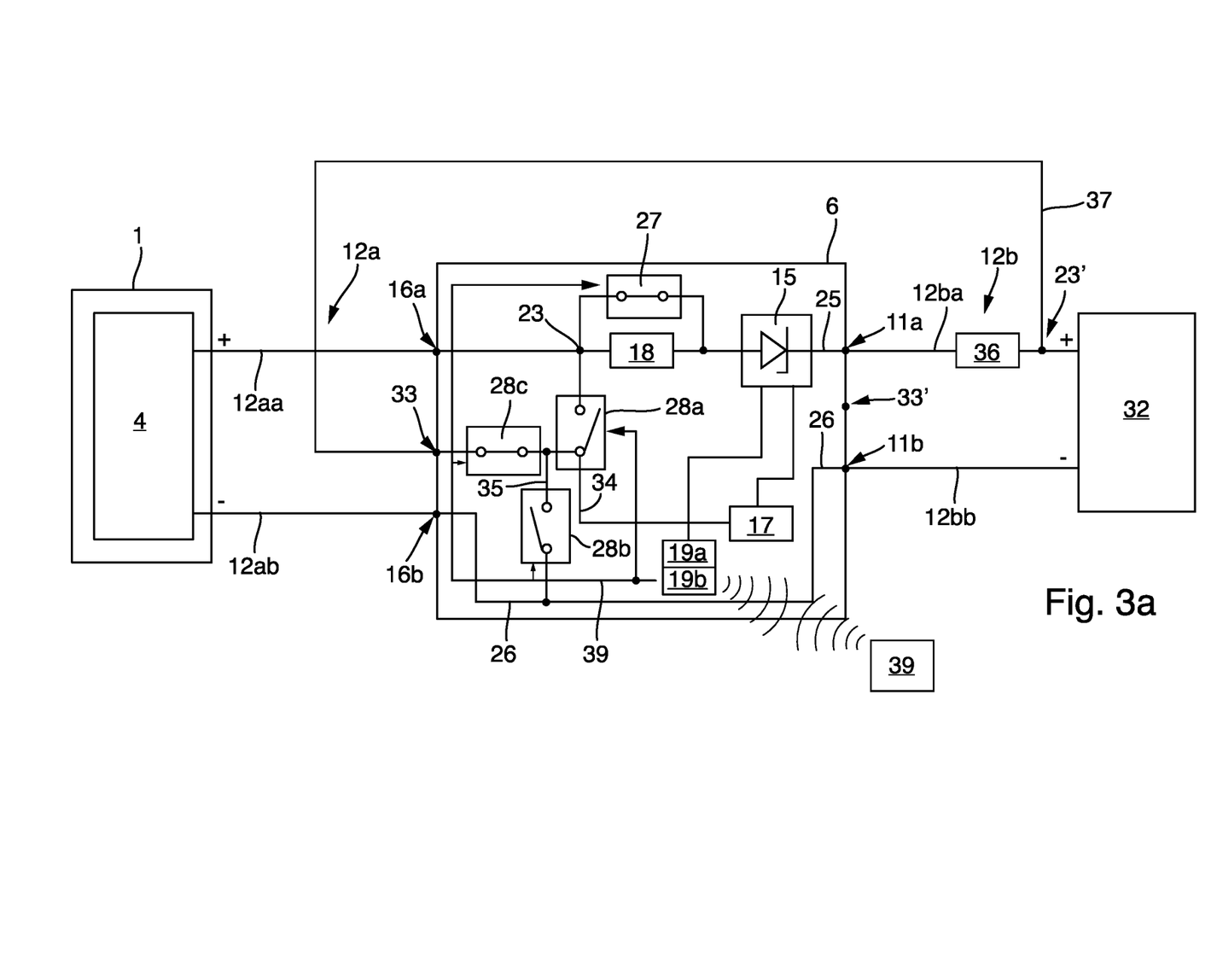
FIG. 3a shows a first schematically shown configuration of the system of the present disclosure.
Figure 3B:
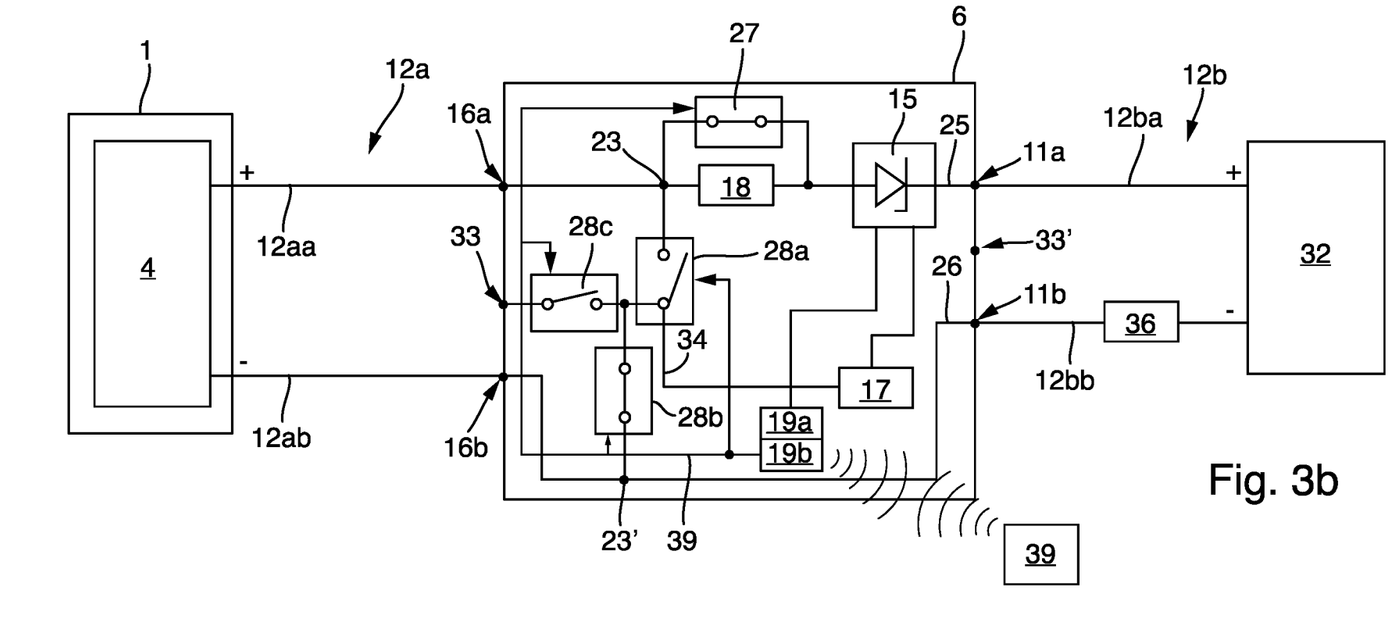
FIG. 3b shows a second schematically shown configuration of the system of the present disclosure.

FIG. 3a shows another configuration, according to which the HART communication resistor is arranged in a plus-conductor 12aa of the first two-conductor line 12a. In order to place the tapping point needed for HART communication in the line region between the already present HART communication resistor 36 and the field device electronics 4, a fifth connecting element 33 contactable from outside of the adapter housing is provided in the adapter electronics. The fifth connecting element 33 can be arranged, for example, in one of the two end faces and be connected with the third connecting line 34 via a fourth switching element 28c. Via the fifth connecting element 33 by means of an external shunting conductor 37 the tapping point 23 can be contacted with the line region between the already present HART communication resistor 36 and the field device electronics 4. FIG. 3a shows the contacting of the tapping point with the line region, by way of example, with the reference character 23'. The fourth switching element 28c serves, when the fifth connecting element is not required, since, for example, the connection of the field device adapter is embodied according to the configuration shown in FIG. 3b, to deactivate the fifth connecting element.

In supplementation or alternatively, the HART communication can be deactivated by the field device adapter via the first and second switching elements 27 and 28a, so that no two conductor signals can be modulated on at the tapping point. For this, the first switching element 27 is switched conducting and the second switching element 28a blocking. A HART communication occurring between the field device and the superordinated unit remains unaffected by this.

In order to control the individual switching elements, an electrical control line 39 is provided, which connects the switching elements with a second radio module 19b. The second radio module 19b is adapted wirelessly to receive a second radio signal provided for controlling the circuit and by means of the second radio signal to switch the switching elements correspondingly. The wireless transmission of the second radio signal 19b occurs preferably via a radio based, point-to-point connection, for example, a Bluetooth-, a Bluetooth Low Energy-, an NFC- or an RFID connection. The second radio module 19b can, such as shown in FIG. 2, be embodied as a separate radio module. Alternatively, the first and second radio modules 19a, 19b can be embodied as a single module.

The invention claimed is:

1. A field device adapter for HART communication with a field device, comprising:
    an adapter housing having a first end and a second end, wherein the first end includes a first connecting element and a second connecting element for electrical connecting of a first two-conductor line and the second end includes a third connecting element and a fourth connecting element for electrical connecting of a second two-conductor line, wherein the adapter housing has, furthermore, an adapter chamber between the first and second ends; and
    an adapter electronics arranged in the adapter chamber, the adapter electronics including:
        a first electrical connecting line that connects the first connecting element with the third connecting element;
        a second electrical connecting line that connects the second connecting element with the fourth connecting element;
        a communication resistor provided in the first connecting line;
        an unregulated power supply circuit for providing a supply voltage from a loop current flowing in the first connecting line;
        a HART modem configured as a secondary master and connected with the first connecting line via a tapping point; and
        a circuit for shunting the communication resistor,
    wherein the adapter electronics is adapted to receive a second radio signal wirelessly and by means of the second radio signal to control the circuit for shunting the communication resistor such that the communication resistor is selectively switchable in and out per radio, so that in a shunted condition a first radio signal received by the adapter electronics can be converted into a two conductor signal and modulated via the tapping point onto the loop current.

2. The field device adapter as claimed in claim 1, wherein the circuit for shunting the communication resistor includes a first switching element having a transistor or an analog switch and connected in parallel with the communication resistor and which is conductive in the shunted condition of the communication resistor.

3. The field device adapter as claimed in claim 2, wherein the circuit for shunting the communication resistor further includes a second and a third switching element, wherein the second switching element is arranged in a third connecting line connecting the HART modem with the first connecting line and the third switching element is arranged in a fourth connecting line connecting the third connecting line with the second connecting line, and wherein the adapter electronics is adapted in the shunted condition to switch the second switching element blocking and the third and fourth switching elements as a function of an installed position of an external HART communication resistor.

4. The field device adapter as claimed in claim 3, wherein the adapter electronics further includes contactable from outside of the adapter housing a fifth connecting element connected with the third connecting line via a fourth switching element, and wherein the adapter electronics is adapted in the shunted condition to switch the second and third switching elements, in each case, blocking and to switch the fourth switching element conducting so that via the fifth connecting element a shunting conductor is connectable to the first two-conductor line.

5. The field device adapter as claimed in claim 3, wherein the adapter electronics further includes contactable from outside of the adapter housing a fifth connecting element connected with the third connecting line via a fourth switching element, and wherein the adapter electronics is adapted in the shunted condition to switch the second switching element blocking and the third switching element and also the fourth switching element as a function of an installed position of the external HART communication resistor.

6. The field device adapter as claimed in claim 3, wherein the adapter electronics is adapted in a turned off condition in which no HART communication initiated by the field device adapter is or should be possible, to switch the first switching element conducting and the second switching element and also the third switching element blocking.

7. The field device adapter as claimed in claim 1, wherein the adapter electronics further includes a second radio module with an antenna for receiving the second radio signal, wherein the power supply circuit supplies the second radio module with energy via the supply voltage and the second radio module is adapted to control the circuit for shunting the communication resistor by the second radio signal, and wherein the second radio module is adapted to receive the second radio signal using a radio-based point-to-point connection, including a Bluetooth-, a Bluetooth Low Energy-, NFC- or RFID connection.

8. The field device adapter as claimed in claim 7, wherein the adapter electronics further includes a first radio module with an antenna for transmitting and/or receiving the first radio signal, wherein the power supply circuit supplies the first radio module with energy via the supply voltage and the first radio module is adapted to convert the two conductor signal into the first radio signal and vice versa, wherein the first radio module is adapted, furthermore, to transmit and receive the first radio signal according to one of the following radio protocols, or radio technologies:
   a Bluetooth protocol or a modified variant thereof,
   a 6LoWPAN protocol,
   a wireless HART protocol,
   a 6TiSCH protocol, and/or
   a mobile radio technology protocol, including 2G, 3G, LTE, 5G, or NB-IoT.

9. A system of automation technology, comprising:
   a field device adapter, including:
      an adapter housing having a first end and a second end, wherein the first end includes a first connecting element and a second connecting element for electrical connecting of a first two-conductor line and the second end includes a third connecting element and a fourth connecting element for electrical connecting of a second two-conductor line, wherein the adapter housing has, furthermore, an adapter chamber between the first and second ends; and
      an adapter electronics arranged in the adapter chamber, the adapter electronics including:
         a first electrical connecting line that connects the first connecting element with the third connecting element;
         a second electrical connecting line that connects the second connecting element with the fourth connecting element;
         a communication resistor provided in the first connecting line;
         an unregulated power supply circuit for providing a supply voltage from a loop current flowing in the first connecting line;
         a HART modem configured as a secondary master and connected with the first connecting line via a tapping point; and
         a circuit for shunting the communication resistor,
      wherein the adapter electronics is adapted to receive a second radio signal wirelessly and by means of the second radio signal to control the circuit for shunting the communication resistor such that the communication resistor is selectively switchable in and out per the second radio signal, so that in a shunted condition a first radio signal received by the adapter electronics can be converted into a two conductor signal and modulated via the tapping point onto the loop current;
   a superordinate unit;
   a field device of automation technology having a field device electronics arranged in a field device housing;
   a first two-conductor line, which connects the adapter electronics via the first and second connecting elements electrically to the field device electronics;
   a second two-conductor line, which connects the adapter electronics via the third and fourth connecting elements electrically to the superordinate unit; and
   a mobile service unit adapted with the aid of the second radio signal to control the circuit for shunting the communication resistor in such a manner that at least the communication resistor is selectively switchable in and out per radio.

10. The system as claimed in claim 9, further comprising:
a HART communication resistor arranged in a plus-conductor of the second two-conductor line and a shunting conductor, wherein the shunting conductor connects the fifth connecting element with the plus-conductor of the second two-conductor line in the region between the power supply circuit and the superordinated unit.

11. The system as claimed in claim 9, wherein the system comprises, furthermore, a HART communication resistor arranged in a minus-conductor of the second two-conductor line.

* * * * *